Sept. 20, 1966 M. F. QUIGLEY 3,274,331

ELECTRICAL CONNECTOR WITH PRE-APPLIED SOLDER

Filed Oct. 12, 1960

INVENTOR.
Mark Francis Quigley
BY Garrett J. Cullen, Jr.
Attorney

United States Patent Office 3,274,331

Patented Sept. 20, 1966

3,274,331

ELECTRICAL CONNECTOR WITH PRE-APPLIED SOLDER

Mark F. Quigley, 84 Beacon St., Boston, Mass.

Filed Oct. 12, 1960, Ser. No. 62,298
4 Claims. (Cl. 174—94)

This application is a continuation-in-part of application Serial No. 663,679, filed June 5, 1957, now abandoned.

This invention relates to electrical connectors and more particularly to a connector which is useful for joining or splicing separate lengths of electrical conductors. This invention may be practiced in connection with the original assembly of a circuit and also in the repairing of a circuit.

At the present time in repairing television, radio, etc., circuits it is very often necessary to check the various elements individually in order to determine whether or not they are in good condition. In the usual construction several resistors, capacitors, etc. are connected to a single junction and in order to check the individual elements it is necessary to separate the leads. This may be done either by cutting the leads or by melting the solder at the junction and separating the leads. Prior to this invention it was not practical to cut the lead inasmuch as it would then be too short in the event it had to be reconnected.

As for melting the solder at the junction, this proves very time consuming since very often the junctions are quite inaccessible and if it is desired to check only one element it is still necessary to disconnect all the elements to the common junction.

It is therefore an object of this invention to provide a means whereby the leads may be cut and then rejoined without necessitating the removal of all the leads to a common junction.

Another object of this invention is to provide a connector constructed so as to require the application of only heat in order to form the bond with an electrical conductor.

A further object of this invention is to provide a connector which will maintain the electrical conductors with which it is to be used in adjusted position for the application of heat.

A still further object of this invention is to provide a connector which may be used in original assembly as well as in replacement of elements.

A yet further object of this invention is to provide a connector which can be used in forming a common junction for a plurality of elements by joining a plurality of connectors together.

A still further object of this invention is to provide an electrical conductor having solder associated therewith and which requires only the application of heat to connect it to the other elements of a circuit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
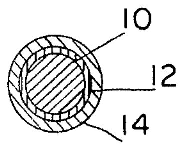
FIGURE 1 is a cross sectional view of a solder coated wire forming one form of this invention.

Referring now more particularly to the accompanying drawings, FIGURE 1 shows a wire 10 having good electrical conducting properties. Surrounding the wire 10 is a coating of flux 12 and an outside coating of solder 14. This wire may be used for forming a connector similar to that shown in FIGURE 4 or may also be used merely to join two terminals of various elements in an electrical circuit. In either case it is merely necessary to apply heat in order to complete the bond.

Figure 2:
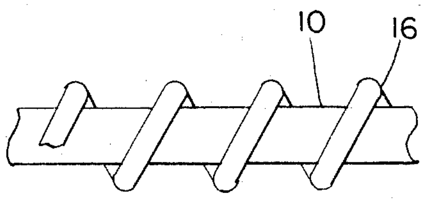
FIGURE 2 is a plan view of another form of wire used in accordance with this invention.

FIGURE 2 illustrates a second form of wire which may be used in practicing this invention. In this form the wire 10 is provided with solder by wrapping a solder wire 16 in spiral form therearound. The solder wire 16 may be flux filled or be solid solder. In the latter case it would be necessary to apply flux thereto prior to the application of heat.

Figure 3:
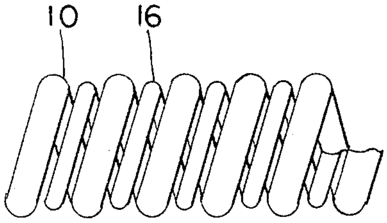
FIGURE 3 is a plan view of one form of connection constructed in accordance with this invention; and, FIGURE 4 is a plan view partly in section showing the completed connection formed in accordance with this invention.

In FIGURE 3 there is illustrated one form of connection constructed in accordance with this invention. The wire 10 is coiled in the form of a spring having an internal diameter substantially equal to the electrical conductor with which it is to be used. Between the coils of the wire 10 are disposed the coils of a solder wire 16. This solder wire 16 may be either flux filled or solid solder. The coils of the solder wire 16 likewise may overlap the coils of the wire 10 or be disposed inwardly thereof.

The connector shown in FIGURE 3, may also be formed by using the wires of FIGURE 1 and 2. In such a case the coils of solder wire between the coils of wire 10 would be omitted.

Figure 4:
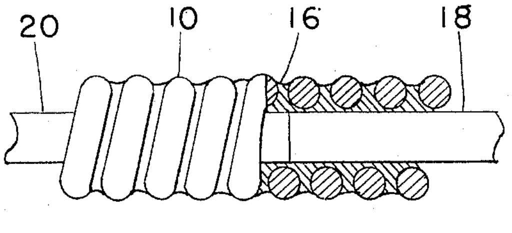

The use of the device is shown clearly in FIGURE 4 wherein two electrical conductors 18 and 20 have been joined in abutting relationship. The solder 16 has been melted and forms a bond between the coiled wire 10 and the conductors 18 and 20.

In using the coil of FIGURE 3 the free ends of the conductors 18 and 20 are inserted in the opposite ends of the coil until they abut each other. Due to the coil being wound with its internal diameter substantially equal to the external diameter of the conductors, the coil and the conductors will remain in place during the application of heat. As the heat is applied the solder will melt and assume the position shown in FIGURE 4 regardless of how the solder was originally disposed with respect to the coil.

The wire 10 in all cases is of a stiffness so as to retain the shape into which it has been coiled or bent and is to have a melting point substantially greater than that of the solder so that the application of heat will not affect the position of the coil.

Further if desired the connector of this invention may be provided with a few coils of reduced diameter at the center thereof whereby when the electrical leads are inserted from opposite ends of the coil they will not go beyond the center, thereby facilitating the location of the connector centrally of the junction.

It will be obvious that any conductor can be cut and then rejoined without shortening its length. Further if desired a bend can be made in the coil and by applying heat the solder will solidify the joint in the position in which it was bent. If desired the coil may be reheated to break the joint by pulling out the conductors when the coil is hot and the solder is in molten state. It may then be reinserted and heat applied to reconnect the conductors.

From the foregoing, the construction and operation of the device will be readily understood and further explanation is believed to be unnecessary. However since numerous modifications and changes will readily occur to those skilled in the art, it is not desired to limit the invention to the exact construction shown and described, and accordingly all suitable modifications and equivalents may be resorted to, falling within the scope of the appended claims.

What is claimed is:

1. As an article of manufacture, a flexible sleeve-like connector assembly for joining opposing related free ends of a pair of oppositely directed electrical leads consisting of an electrical conducting wire and heat responsive fluxed bonding material for effecting a mechanically bonded electrical connection between said sleeve-like connector unit and said respective electrical leads, said electrical conducting wire and said fluxed bonding material being helically coiled to form a flexible, hollow tube-like unit open at its ends and of an internal diameter adapted to grippingly encompass the respective free ends of the electrical leads to supportingly maintain said flexible sleeve-like connector and said electrical leads in position before and during application of heat thereto, said fluxed bonding material being disposed at least between turns of said conducting wire which are disposed to encompass the respective ends of said electrical leads whereby upon encircling association of said tube-like unit with the opposing related ends of said electrical leads and application of heat selectively to the opposite ends of said tube-like unit and the respective opposing ends of said electrical leads the fluxed bonding material will melt and flow to effect a mechanical bond and electrical connection between said conducting wire and said respective electrical leads, said fluxed bonding material comprising a flux carrying solder wire structurally distinct from said conducting wire in that the flux carrying solder wire is in independent side by side relationship to said conducting wire and at least portions of which are disposed between adjacent turns of said electrical conducting wire.

2. The article of manufacture of claim 1 wherein the flux carrying solder wire is helically wound around said electrical conducting wire to form a compound wire element and said tube-like unit comprises a close helical coil of said compound wire element.

3. The article of manufacture of claim 1 wherein the flux carrying solder wire and said conducting wire are concentric and intercoiled such that a turn of solder wire is interposed between each adjacent pair of turns of conducting wire.

4. The article of manufacture as defined in claim 1, wherein the flux of said solder wire is disposed internally of the solder thereof prior to use of said article.

References Cited by the Examiner

UNITED STATES PATENTS

| | | | |
|---|---|---|---|
| 246,484 | 8/1881 | Field | 287—104 |
| 294,549 | 11/1884 | Waring | 174—88 |
| 455,986 | 7/1891 | Hayes et al. | |
| 695,705 | 3/1902 | Batchelor | 174—84 |
| 1,980,890 | 11/1934 | Tompkins. | |
| 2,055,393 | 9/1936 | Thomas. | |
| 2,664,844 | 1/1954 | Siegrist et al. | |

OTHER REFERENCES

Publication I: "Field-Shop Service Notes," published in Service, February 1958, page 34 relied on.

LEWIS H. MYERS, *Primary Examiner.*

E. JAMES SAX, *Examiner.*

D. L. CLAY, *Assistant Examiner.*